May 30, 1950 C. A. BLAKESLEE 2,509,329
CONTROL APPARATUS
Filed April 26, 1944 2 Sheets-Sheet 1

INVENTOR.
Clinton A. Blakeslee
BY
E. C. Sanborn
Attorney

May 30, 1950　　　　C. A. BLAKESLEE　　　　2,509,329
CONTROL APPARATUS
Filed April 26, 1944　　　　　　　　　　　　2 Sheets-Sheet 2
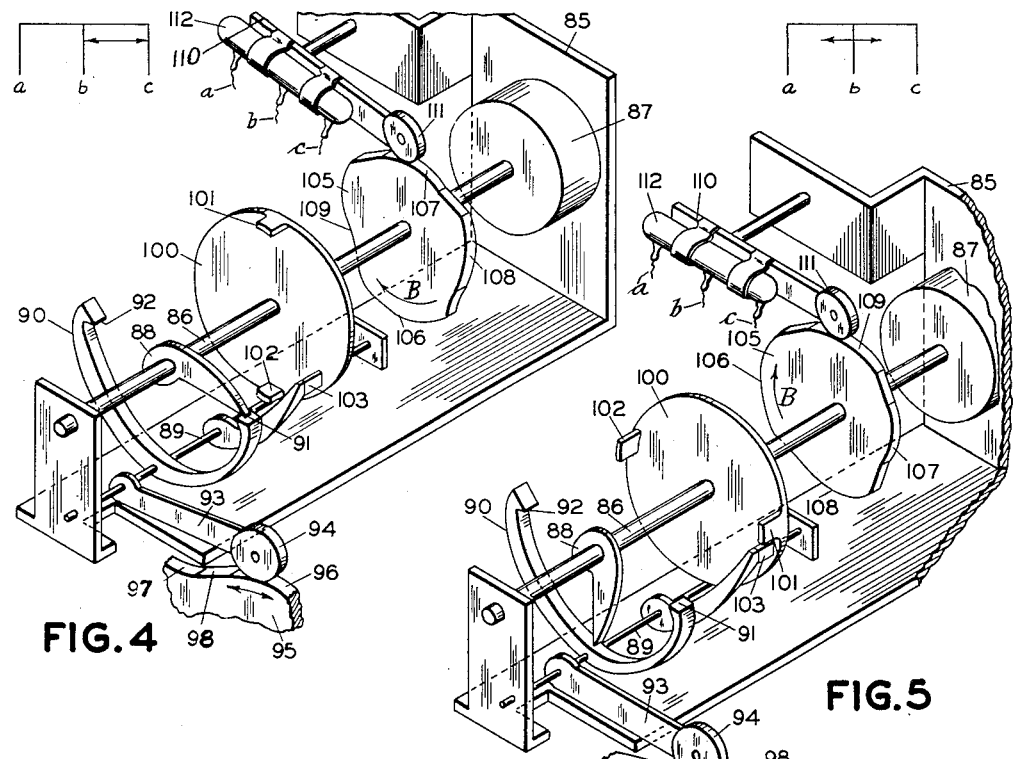
FIG. 4
FIG. 5
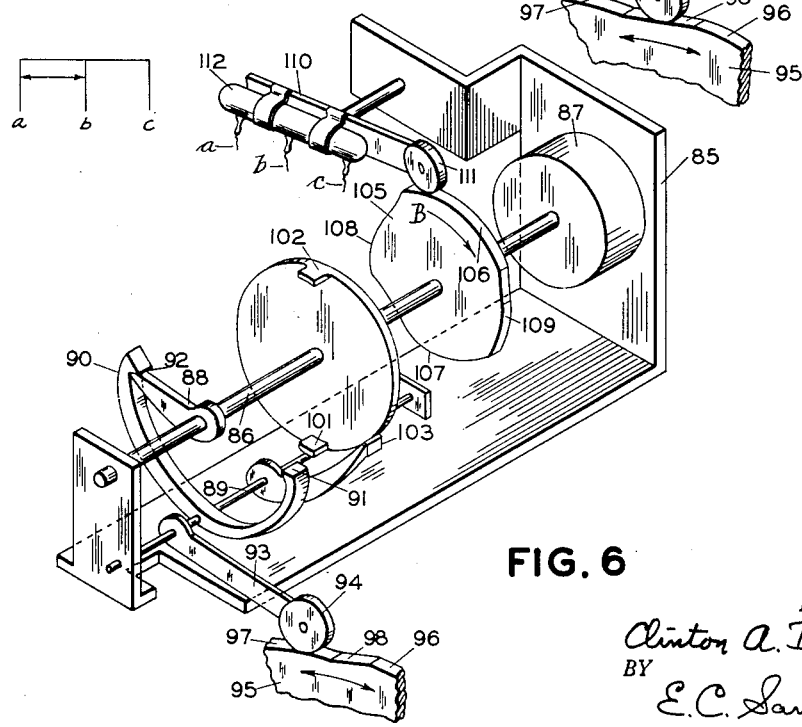
FIG. 6
INVENTOR.
Clinton A. Blakeslee
BY
E. C. Sanborn
Attorney Patented May 30, 1950

2,509,329

UNITED STATES PATENT OFFICE 2,509,329

CONTROL APPARATUS

Clinton A. Blakeslee, Waterbury, Conn., assignor to The Bristol Company, Waterbury, Conn., a corporation of Connecticut Application April 26, 1944, Serial No. 532,783

17 Claims. (Cl. 236—70)

This invention relates to control devices, and more especially to means for obtaining a rapid and positive actuation of control couples in response to an extremely small change in the magnitude of a controlled variable. In the performance of automatic control it is customary to perform a measurement on the controlled variable by means of a sensitive measuring instrument such as a pyrometer or potentiometer, or the like, and to regulate the magnitude of said variable by means of a valve or other device for affecting the flow of a condition-modifying agent, said valve being operated by an electrical or fluid-actuated motor. A principal function of the art of automatic control lies in the provision of suitable servomotor or relay means between said measuring instrument and said regulating unit, whereby the former may be caused to command the performance of the latter with a maximum degree of sensitivity and a minimum expenditure of power.

Examples of devices for rendering regulating elements subject to the command of measuring instruments are found in U. S. Letters-Patent No. 2,115,528 issued to O. H. Hunt, April 26, 1938 and in U. S. Letters-Patent No. 2,326,238 issued to A. R. Mabey, Aug. 10, 1943. In said Hunt patent, a self-balancing instrument of the potentiometer class is caused to operate a diagonally slotted cam which is adjustable in a path parallel to that of the potentiometer index, said cam being directly connected to a control couple. In said Mabey patent a self-balancing instrument of the potentiometer class is caused to operate one member of a differential gearing, the other corresponding member of said gearing being manually adjustable, and a cam subject to the joint influence of said members being arranged for direct actuation of a control couple.

It is an object of the present invention to provide means whereby a measuring instrument having a part deflectable in proportion to changes in a magnitude to be controlled may be caused to initiate a "threshold" or "trigger" effect, whereby a servomotor is caused to operate a controlling device with a rapid and positive action.

It is a further object to provide means of the above nature which shall be regularly applicable to a variety of control couples, such as solid-contact switches, mercury switches, and pilot valves.

It is a further object to provide a device of the above nature which shall be self-restoring in the event of forcible disturbance of the setting of the control couple.

It is a further object to provide a device of the above nature which shall be readily adaptable to either a two-position, or three-position, system of control.

In carrying out the purposes of the invention it is proposed to provide for the actuation of the control couple a motor subjected to continuous energization for movement in one direction but adapted to withstand forcible restraint for indefinite periods without injury to said motor or to elements of mechanism associated therewith. It is further proposed to include in the mechanical train connecting said motor to said control couple an element in the nature of a detent or escapement which, under command of the associated measuring instrument, may release said motor and associated mechanism from restraint for motion through a limited excursion sufficient to effect a change in the condition of the control couple.

Figs. 4, 5, and 6 are perspective views of an alternative form of the invention in three characteristic positions of operation to give electric contact arrangements as indicated in the corresponding insets.

Fig. 7 illustrates an alternative application of the form of the invention shown in Figs. 4, 5, and 6.

Figure 1:
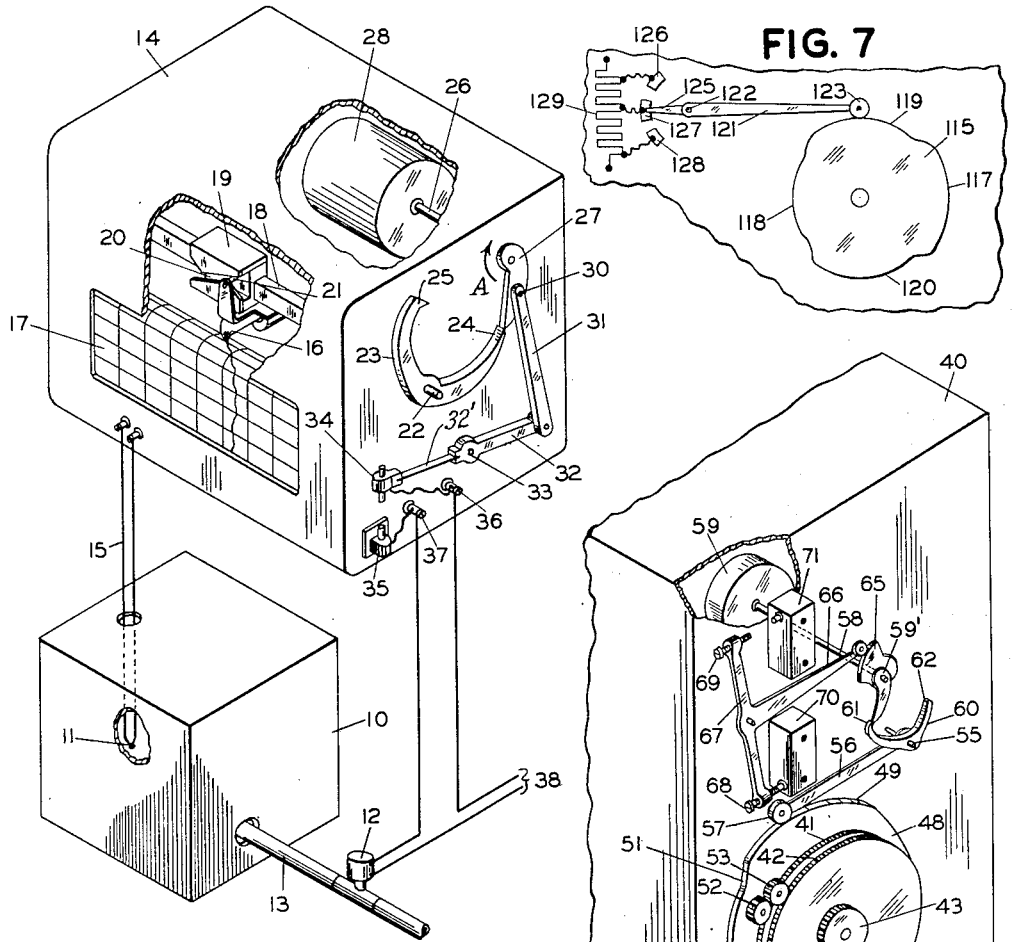
Figs. 1 and 2 are perspective views illustrating applications of the principles of the invention to potentiometer-controllers of the types shown in the hereinbefore mentioned Hunt and Mabey patents respectively.

In Fig. 1 is shown an application of the principle of the invention to a self-balancing potentiometer-controller of the type set forth in the hereinbefore mentioned Hunt Patent No. 2,115,528 when utilized for the purpose of regulating the temperature in a fluid-fuelheated oven. The numeral 10 designates an oven or like enclosed space in which it is desired to maintain a predetermined constant temperature as detected by a thermocouple 11 and as controlled by means of a solenoid-operated valve 12 adapted to be opened when the winding thereof is electrically energized, said valve being in a fuel line 13 leading to a burner within said oven. A measuring and controlling instrument 14 of the type fully described and set forth in said Hunt patent, and connected to the thermocouple 11 by means of a circuit 15, includes a pen or similar indicating or recording device 16 adapted to be positioned along a graduated chart or scale 17 in response to changes in the temperature detected by the thermocouple 11, and thereby to provide on said chart or scale a measure of the temperature to which said thermocouple is exposed.

Disposed parallel to the path of the pen 16, as in said Hunt patent, is an extended bar or rod 18 having slidably and adjustably mounted thereon an actuating member 19 with an inclined slotted cam portion 20 adapted to be engaged by a pin 21 mounted integral with the pen 16, and being deflectable therewith to different positions according to the value of the measured temperature. The bar 18 is fixed to a shaft or spindle 22 parallel to the extended length of said bar, whereby said bar and spindle may be rotated through a limited angle as the pin 21 passes through the inclined cam portion 20 and to an angular position depending upon the deflected position of said pin with respect to its normal path of excursion.

Fixed to the spindle 22 is a verge member 23 of forked structure, terminating in pallets 24 and 25. Juxtaposed to the verge member 23, and carried by a shaft or spindle 26 is a toothed member or detent 27, adapted to be rotated with the shaft 26 in a path intersected alternatively by the pallets 24 and 25. The relative dispositions of the pallets 24 and 25 with respect to the detent 27 are such that the latter may be engaged by either of said pallets if the movement of the verge 23 has brought the same within the path followed by said detent, but that the possible angular motion of the verge member with the shaft 22 corresponding to the deflection of the cam member 20, will permit the pallets 24 and 25 respectively and alternatively to clear the path of the detent 27, whereby the latter may be advanced from the position where it engages one of the pallets to the position where it engages the other of the same. The relative action of the verge 23 with its pallets in respect to the detent 27 is substantially equivalent to that of the escapement of a timepiece, whereby complete revolution of the shaft 26 can be accomplished only after the verge member 23 has been caused to perform one complete oscillation. Mechanically attached to the shaft 26 and tending to rotate the same in a clockwise sense as indicated by the arrow A in the drawing to cause the detent 27 to be engaged and stopped atlernatively by the pallets 24 and 25, is a torque motor 28 adapted for continuous energization but capable of being indefinitely restrained without injury. Examples of such are to be found in many of the self-starting electric clock motors, or in a small commutating motor having a suitable resistance connected in series with its source of supply. The equivalent of a torque motor is provided in the spring or weight-driven mechanism of any ordinary timepiece.

Attached to the detent 27, as by a crank or offset shaft 30, is a connecting rod or pitman 31 pivotally attached to one end of an extended lever arm 32 which is oscillatable through a limited angle about a pivot mounting 33 carried by the frame of the instrument 14. Yieldingly carried by a resilient strip 32' forming a part of the lever arm 32 is an insulated contact member 34. Mounted upon the frame of the instrument 14 but insulated therefrom is a contact member 35 adapted to be engaged and disengaged by the contact 34 as the lever arm 32 is oscillated to one or other of its positions of rest as determined by the pallets 24 and 23 respectively. The contacts 34 and 35 are suitably connected to insulated terminals 36 and 37, and thereby placed in series with the winding of the electrically operated valve 12 and a source of power supply 38.

The relative positioning of the elements of the mechanism as shown in Fig. 1 is that in which the pin 21 has just passed to the right-hand or "up-scale" end of the block 19, the latter, including the shaft 22 and the verge 23 having been tilted to an extreme position by the passage of the pin 21 through the slotted member 20. During the up-scale excursion of the pin 21 the tilting of the shaft 22 is in such a sense that the pallet 24 of the verge 23 will be interposed in the path of the detent 27, preventing further rotation in the direction of the arrow under the influence of the torque motor 28. The position of the crank member 30 carried by the detent 27 will be such that the lever arm 32 as actuated from said crank member through the pitman 31 will act to separate the contacts 34 and 35, thereby opening the electrical circuit between the supply 38 and the valve 12. This will allow said valve to close, reducing the fuel supply through the pipe 13 to the oven 10, and tending to cause the temperature as detected by the thermocouple 11 to fall.

With the cooling consequent upon the interruption to the fuel supply, the temperature as detected by the thermocouple 11, and as measured by the instrument 14, will begin to fall, with the consequence that the pen 16 and the pin 21 will be moved toward the left as seen in the drawing; and the latter, co-acting with the slotted member 20, will tend to rotate the block 19, the bar 18, the spindle 22, and the verge 23 in a sense to cause the pallet 24 to clear the tip of the detent 27, leaving the latter free to be rotated in the direction indicated by the arrow under the influence of the torque motor 28. The motion of the verge 23, while clearing the pallet 24 from engagement with the detent 27, will at the same time interpose the pallet 25 in the path of said detent, so that rotation of the latter will continue only until its tip engages the pallet 25, when the motor 28 will be inhibited from further action, and the mechanism brought to rest in a new position. The proportioning of the parts is made such that, with the detent 27 in engagement with the pallet 25, the lever arm 32 in response to the action of the crank 30 through the pitman 31, will bring the contacts 34—35 into engagement thereby completing a circuit from the source of supply 37 to the electrically actuated valve 12, causing said valve to be opened and fuel admitted to the oven 10. The consequent increase of temperature to which the thermocouple 11 is exposed will cause the pen 16 and the pin 21 to be moved toward the right, ultimately restoring the block 19 and the verge 23 to the positions shown in the drawing, whereupon the detent 27, being liberated by the pallet 25 and acting under the influence of the torque motor 28, will rotate until it again engages the pallet 24, thus completing one revolution and coming to rest in the position indicated. The resilient mounting provided for the contact 34 by the strip 32' permits the lever arm 32 to be swung through a considerably greater angle than is necessary to bring the contacts 34—35 into engagement, thereby assuring a positive electrical contact, and also preventing the mechanism from binding as the crank 30 rotates throughout its complete revolution.

Figure 2:
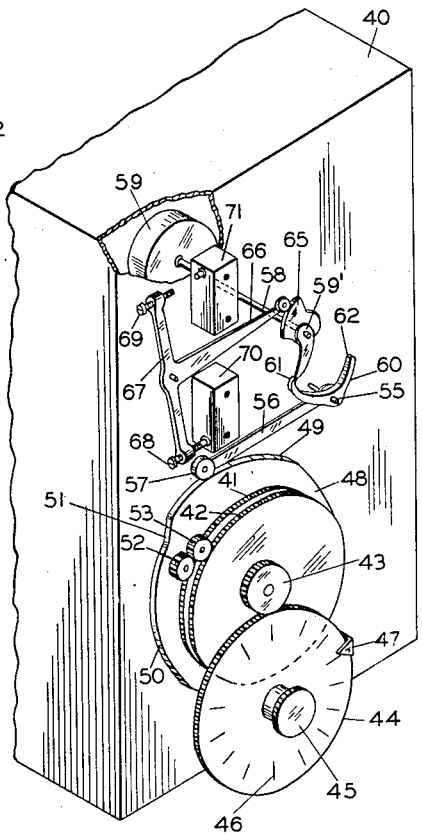

In Fig. 2 is shown an application of the principle of the invention to a self-balancing potentiometer controller of the type set forth in the hereinbefore mentioned Mabey Patent No. 2,326,238. The numeral 40 designates the end plate of an instrument of the type set forth in said Mabey patent, and including a spur gear 41 adapted to be rotated by a balancing mechanism (not shown in the drawing), and to assume an angular position representative of the value of a measured magnitude. Mounted coaxially with the gear 41 is a spur gear 42 identical in pitch and diameter with the gear 41 and slightly displaced therefrom along the common axis. Attached to the gear 42 is a pinion 43 and meshing with said pinion is a gear member 44 rotably mounted upon the plate 40, and adapted for manual adjustment by means of a knob 45, whereby the angular position of the gear 42 may be pre-established at will. The gear 44 carries a graduated scale portion 46, which, in cooperation with a stationary index 47, provides an indication of the adjusted position of the gear 44, and therefore of the gear 42. Mounted coaxially with the gears 41 anud 42 and free for rotation with respect to said gears, is a cam member 48 having a peripheral portion 49 of maximum radius and a peripheral portion 50 of minimum radius, together with a peripheral portion 51 forming a transition between the peripheral portions 49 and 50. Pivotally mounted upon the cam member 48 is a pinion 52 having its axis of rotation parallel to the common axis of said cam member and said spur gear members. The pinion 52 meshes with the spur gear 41, and extends beyond said gear into the space adjacent to the spur gear 42, but not sufficiently far to mesh with the latter. Pivotally mounted upon the cam member 48 is a pinion 53 axially positioned to mesh with the spur gear 42 and to extend over the space between gears 41 and 42 to mesh with the pinion 52 but not with the gear 41. The coaxial assembly of gears 41 and 42 and cam 48, together with the pinions 52 and 53 pivotally mounted upon said cam member and meshing with each other, and one with each of the representative gears 41 and 42, constitutes a differential or planetary train, wherein the cam member 48 will partake of an angular motion which is the resultant of the angular motions of the spur gears 41 and 42. Thus, if said spur gears are rotated through equal angular displacements in opposite sense about their common axis, the cam member 48 will remain at rest; and, in any event the angular displacements of said cam member will be proportional to the difference of the positive displacement of the one, and the negative displacement of the other, of said spur gear members. The mechanism as thus far set forth is the full equivalent of that shown in said Mabey patent, wherein a cam member is caused to assume a position which shall be the resultant of deflection of a measuring unit and that of a manually adjusted setting element; and for this combination no invention is herein claimed.

Pivotally mounted upon a spindle 55 attached to the plate 40 is a follower-arm 56 carrying a roller 57 adapted to engage the periphery of the cam member 48 whereby said arm will be angularly displaced about said spindle according to the radius of the cam 48 at the point of its engagement by the roller 57. A shaft 58 journaled in the plate 40 has mechanically attached thereto a torque motor 59 continuously tending to rotate said shaft in a clockwise direction as seen in the drawings, but adapted for indefinite restraint without injury to said motor or associated parts. Attached to the shaft 58 is a detent 59' adapted upon obstruction to prevent rotation of the shaft 58 and to stall the motor 59. Fixed to the arm 56 and deflectable therewith through a limited angle about the spindle 55 is a verge member 60 having pallets 61 and 62 interposed in the path of the detent 59', whereby one or the other of said pallets may be engaged by said detent, according to the deflected position of the arm 56, to stall the motor 59 and bring the shaft 58 and all parts carried thereby to a condition of rest.

The proportioning of the elements of the mechanism is made such that, when the roller 57 rests in engagement with the peripheral portion 49 of the cam member 48, as indicated in the drawing, the pallet 61 will lie in the path of the detent 59' and bring said detent to rest in a corresponding position, and when said roller is in engagement with the portion 50 of said cam member the pallet 62 will lie in the path of the detent 59' causing it to be restrained in a corresponding position. Fixed to the shaft 58 is a cam member 65; and engaging said cam member is a follower-arm 66 pivoted to the plate 40, and adapted for limited angular motion about its pivot point according to the radius of the portion of the cam member 65 engaged thereby. Carried by the follower-arm 66 is an extended cross-piece 67 having at its extremities adjustable tappets 68 and 69. Mounted upon the plate 40, and subject to actuation by tappets 68 and 69 respectively, are two snap switches 70 and 71. These switches may expediently be of the type known under the trade name of "Microswitch," one form of which is fully described in U. S. Letters-Patent No. 1,960,020 issued to P. K. McGall, May 22, 1934. The adjustment of the tappets 68 and 69 is made such that when the arm 66 lies upon the cam member 65 in a position determined by the engagement of the detent 59' with the pallet 61, the actuating element of the switch 70 will be operatively engaged by the tappet 68, and when the arm 66 lies in a position determined by engagement between the detent 59' and the pallet 62, the actuating element of the switch 71 will be operatively engaged by the tappet 69, and that of the switch 70 will be released from engagement by the tappet 68. The electrical connections of the switches 70 and 71 are not shown in the drawing, but may have any one of a large variety of arrangements well known in the art of automatic control.

Figure 3:
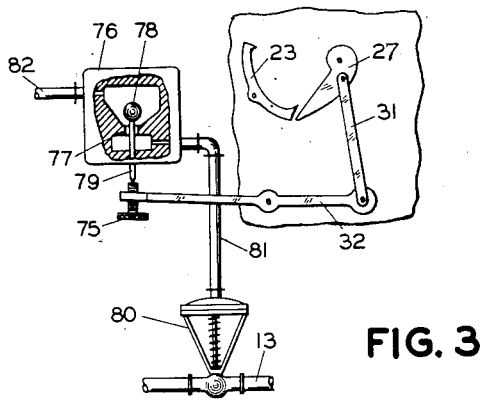
Fig. 3 shows the invention as described in connection with Fig. 1, when applied to pneumatic control.

In Fig. 3 is shown an adaptation of the form of the invention shown in Fig. 1 to the operation of a control couple in the nature of a pilot valve adapted to the regulation of air flow in a pneumatic control system. The verge 23, the detent 27, the pitman 31, and the lever arm 32, are shown in the same interrelationship that they bear in Fig. 1 of the drawings; and the contact 34 of said Fig. 1 is replaced by an adjustable tappet 75 carried by the extremity of the lever arm 32. A pilot valve 76 comprising a body part having a seat portion 77 adapted for engagement by a valve member 78 subject to actuation by a stem 79, is mounted upon the framework of the instrument whereby said stem may be engaged by the tappet 75, causing the portal formed by the seat portion 77 and the valve member 78 to be opened or closed according to the deflected position of the tappet 75 as carried by the lever arm 32. A valve especially suited to this purpose, and providing a vent whereby when said valve is in its closed position air is quickly exhausted from the device under control, is fully disclosed and set forth in U. S. Letters Patent No. 1,890,494 granted to P. A. Borden, December 13, 1932.

A pneumatically operated valve 80 replacing the valve 12 in the conduit 13 as shown in Fig. 1, is adapted to be closed by the application of air pressure to its operating element through a suitable conduit 81. The pilot valve 76 is connected between a source of air supply 82 and the conduit 81 to permit or interrupt the flow of air from said source into said conduit according to the position of the valve member 78 with respect to the seat portion 77.

With connections as indicated, and the detent 27 restrained in the position shown, which, by reference to Fig. 1 will be seen to correspond to a condition of high temperature, the tappet 75 will be maintained in engagement with the stem 79, holding the seating member 78 out of engagement with the seat portion 77, whereby air from the source 82 will be admitted through the pilot valve 76 and the conduit 81 to the motor element of the valve 80, causing the same to be closed and to inhibit the flow of fuel to the furnace under control. Similarly, as fully set forth in the explanation of the form of the invention shown in Fig. 1, when the measured temperature falls below the pre-established control point, the detent 27 will be caused to assume a position wherein the lever arm 32 will be deflected through a limited angle in a counter-clockwise sense, withdrawing the tappet 75 from engagement with the stem 79, allowing the valve 76 to be closed, and relieving air pressure on the motor element of the valve 80, whereby said motor valve will tend to open and to admit an increased supply of fuel to the space whose temperature is under control.

In Figs. 4, 5, and 6 is illustrated in three characteristic operative positions, a form of the invention especially adapted to use with the type of measuring instrument shown in Fig. 2, and having in addition to the two extreme operative positions characteristic of the hereinbefore disclosed forms of the invention an intermediate or "neutral" operative position which may be assumed by the control elements of the mechanism when the controlled magnitude has been brought to a value lying within a pre-established narrow operating range. Journaled in a suitable mounting frame 85 is a shaft 86 having mechanical connection to a torque motor 87, whereby said shaft is continuously urged for rotation in a clockwise sense as indicated by the arrow B in the drawings. Attached to the shaft 86 is a detent 88 rotatable with said shaft, whereby an extremity of said detent may follow a definite circular path coaxial with said shaft. Journaled in the frame 85 and disposed parallel to the shaft 86 is a shaft 89 having fixed thereto a verge member 90 bearing pallets 91 and 92 adapted to be interposed in the path of the extremity of the detent 88. An arm 93 fixed to the shaft 89 carries on its extremity a roller or cam follower 94 adapted to coact with the periphery of a cam member 95 whereby the shaft 89 will be caused to rock through a limited angle according to the height of the portion of the cam member 95 engaged by the follower 94. The cam member 95 corresponds in all respects to the cam member 48 shown in Fig. 2, and is similarly subject to positioning by the joint influence of a measuring device and a manually actuated adjusting device not shown in the drawings. Said cam member has peripheral portions 96 and 97 of "high" and "low" magnitude, representing the extreme deflected positions of the shaft 89, and a transitional portion 98 providing a smooth gradient to be followed by the roller 94 in passing from one another of its extreme positions. The portions 96, 97, 98 of the cam member 95 correspond to the portions, 49, 50 and 51 of the cam member 48 as shown in Fig. 2, and described in that part of the specification which refers thereto.

The relative positioning and adjustment of parts of the mechanism shown in Fig. 4, as thus far set forth, are such that when the follower 94 rests upon the high portion 96 of the cam member 95 the pallet 91 of the verge member 90 will be interposed in the path of the detent 88, definitely positioning said detent, the shaft 86, and all parts connected thereto, under the influence of the torque motor 87, and when the follower 94 engages the low portion 97 of the cam member 95, the pallet 91 will be moved clear of the detent 88, allowing the same together with the shaft 86 and all parts attached thereto to be rotated under the influence of the torque motor 87 to a position where said detent engages the pallet 92 and is brought to rest with the shaft 86 rotated through a substantial angle from the position formerly occupied. If, with the elements of the mechanism in said last-named position, the cam member 95 is returned to a location where the high portion 96 of the periphery again engages the follower 94, the pallet 92 will be cleared from the detent 88, allowing the latter to continue its revolution until again engaged and brought to rest by the pallet 91 interposed in its path of travel.

Fixed to the shaft 86 is a stop member 100 provided with diametrically opposed teeth 101 and 102; and fixed to the shaft 89 is a pawl 103 juxtaposed to the stop member 100. The proportioning and relative positioning of the teeth 101 and 102 and the pawl 103 is made such that, when the follower 94 is in engagement with the high portion 96 of the cam member 95, the pawl member 103 as positioned with the shaft 89 will lie inside the circular path described by the teeth 101 and 102, so that said teeth, upon rotation of the stop member 100 will pass said pawl member without engaging the same. The adjustment is further made such that when the follower 94 is in engagement with the lower portion 97 of said cam member the pawl 103 will lie outside the circular path described by said teeth, again allowing them to pass freely without engagement. When the follower 94 lies on the intermediate portion 98 of the cam member 95 the pawl 103 will assume such a position that it lies directly in the path of the teeth 101—102 and will obstruct whichever one of these attempts to pass with rotation of the stop member 100. Thus, upon release of the detent 88 by the pallet 91 due to the follower 94 entering upon the intermediate portion 98 of the cam member 95 with motion of the latter toward the right as seen in the drawing under the influence of the controlling instrument, rotation of the shaft 86 will be permitted only sufficiently far to bring about engagement of the tooth 101 with the pawl 103, whereupon the shaft 86 and all parts attached thereto will come to rest as indicated in Fig. 5 of the drawings. Similarly, upon release of the detent 88 by the pallet 92 as the follower 94 climbs upward upon the intermediate portion 98 with motion of the cam element 95 toward the left as seen in the drawing, the tooth 102 will engage the pawl 103 bringing the mechanism to rest with the shaft 86 and all parts attached thereto in a position diametrically opposed to that shown in Fig. 5.

Fixed to the shaft 86 as a cam member 105 having a peripheral portion 106 of maximum radius, a portion 107 of minimum radius and opposed portions 108 and 109 of intermediate radius, said portions being connected by smooth transitional surfaces. Pivotally mounted upon the frame 85 is an arm 110 carrying a follower 111 adapted to engage the periphery of the cam 105 whereby said arm may be rocked through a limited angle to any one of three distinct positions corresponding to the respective radii of the several portions of the cam member 105. Attached to the arm 110 is a three-position mercury switch 112 having contacts a, b, c. The spacing of the several peripheral portions of the cam member 105 and the adjustment of the mercury switch 112 and adjusted parts with respect thereto is made such that for each of the four positions in which the shaft 86 and elements attached thereto may be brought to rest, the follower 111 will rest upon one of the peripheral portions of the cam member 105 and will cause the switch 112 to be rocked into a position giving a definite electrical contact arrangement. With the elements of the mechanism in the position shown in Fig. 4, the follower 111 will rest upon the portion 107 of the cam 105 having a minimum radius, causing the contacts b and c to be electrically connected as indicated in the inset of Fig. 4. With the tooth 101 engaged by the pawl 103, the follower 111 will rest upon the intermediate radius portion 109 of cam 105 causing the switch 112 to assume a substantially horizontal position as indicated in Fig. 5 and all contacts of said switch to be separated, as indicated in the corresponding inset. With the follower 111 engaging the maximum radius portion 106 of the cam 105 as shown in Fig. 6, the switch 112 will be tilted to a position where contacts a and b are connected, as shown in the corresponding inset. When the shaft 86 comes to rest with the tooth 102 engaging the pawl 103, and the shaft 86 in a position diametrically opposite to that indicated in Fig. 5, the follower 111 will rest upon the intermediate radius portion 108 of the cam 105, causing the switch 112 again to assume a horizontal position with all its contacts separated as indicated in the inset of Fig. 5. There has thus been provided means whereby a control couple may be caused to assume either of two extreme positions, or an intermediate position, according to the deflection of a measuring element in relation to a pre-established control point.

In Fig. 7 is shown an adaptation of the form of the invention having three distinct positions of rest to the setting of an electrical rheostat whereby control may be effected upon an electrical circuit. A cam member 115 similar in all respects to cam 105 shown in Figs. 4, 5, and 6, and subject to positioning in a manner similar to said previously described cam, is provided with opposed peripheral portions 117 and 118 of maximum and minimum radius and intermediate opposed peripheral portions 119 and 120 of intermediate radius. An arm 121 pivoted for deflection through a limited angle about a fixed spindle or shaft 122 is provided with a roller or follower member 123 adapted to engage the periphery of cam 115, whereby the arm 121 will be caused to take up an angular position about the shaft 122 corresponding to the radius of the particular peripheral portion engaged by said roller. Attached to the arm 121 is a rheostat contact member 125 adapted to engage one or other of a plurality of contacts 126, 127 and 128, forming connections to the circuit of a rheostat 129, according to the deflected position of the arm 121, and therefore according to the position assumed by the cam 115. Thus there has been provided means whereby a rheostat adapted to act in an electrical regulating circuit may be adjusted by a system of control embodying the principles of the invention.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, control means including an element adapted to assume a plurality of positions and thereby correspondingly to affect the magnitude of a controlled variable, a motor continuously tending to impel said element from one to another of said positions, detent means connected to said motor, means cooperating with said detent means for restraining operation of said motor in a given position of said cooperating means and for releasing said motor to actuate said element in another position of said cooperating means, means responsive to changes in said magnitude, and servo-motor means controlled by said responsive means for actuating said cooperating means.

2. In combination, switch means adapted to assume a plurality of positions and thereby correspondingly to affect the magnitude of a controlled variable, a motor continuously tending to operate said switch means, detent means connected to said motor, means cooperating with said detent means for restraining operation of said motor in any of said positions, means responsive to changes in said magnitude, and servo-motor means controlled by said responsive means for positioning said cooperating means in accordance with whether said magnitude is greater or less than a predetermined value.

3. In combination, valve means adapted to assume a plurality of positions and thereby correspondingly to affect the magnitude of a controlled variable, a motor continuously tending to operate said valve means, detent means connected to said motor, means cooperating with said detent means for restraining operation of said motor in any of said positions, means responsive to changes in said magnitude, and servo-motor means controlled by said responsive means for positioning said cooperating means in accordance with whether said magnitude is greater or less than a predetermined value.

4. In combination, a control couple adapted to assume any one of a plurality of predetermined positions and thereby correspondingly to affect the magnitude of a controlled variable, a torque motor adapted to move said couple into said positions, detent means mechanically attached to said torque motor, an escapement adapted for engagement by said detent means to stall said motor in any one of said positions, means responsive to changes in said magnitude and servo-motor means cooperating with said responsive means for positioning said escapement in accordance with whether said magnitude is greater or less than a predetermined value.

5. In combination, a control couple adapted to assume any one of a plurality of predetermined positions and thereby correspondingly to affect the magnitude of a controlled variable, a torque motor adapted to move said couple into said positions, detent means mechanically attached to said torque motor, means responsive to changes in said condition, servo-motor means controlled by said responsive means, a verge member movable by said servo-motor means to different positions in accordance with whether said condition is greater or less than a predetermined value, and pallets movable with said verge member and adapted to be engaged by said detent to stall said torque motor.

6. In combination, a switch means adapted to assume any one of a plurality of predetermined positions and thereby correspondingly to affect the magnitude of a controlled variable, a torque motor adapted to move said switch means into said positions, detent means mechanically attached to said torque motor, an escapement adapted for engagement by said detent means to stall said motor in any one of said positions, means responsive to changes in said magnitude, and servo-motor means controlled by said responsive means for positioning said escapement in accordance with whether said magnitude is greater or less than a predetermined value.

7. In combination, a valve means adapted to assume any one of a plurality of predetermined positions and thereby correspondingly to affect the magnitude of a controlled variable, a torque motor adapted to move said valve means into said positions, detent means mechanically attached to said torque motor, an escapement adapted for engagement by said detent means to stall said motor in any one of said positions, means responsive to changes in said magnitude, and servo-motor means cooperating with said responsive means for positioning said escapement in accordance with whether said magnitude is greater or less than a predetermined value.

8. In combination, a control couple adapted to assume any one of a plurality of predetermined positions and thereby correspondingly to affect the magnitude of a controlled variable, a rotatable shaft, a cam member thereon and having peripheral portions of different radii, a cam follower attached to said control couple and adapted to engage the periphery of said cam whereby to move said couple to said positions, a torque motor operatively connected to said shaft to rotate the same, detent means mechanically attached to said torque motor, an escapement adapted for engagement by said detent means to stall said motor in any one of said positions, and means responsive to changes in said variable and adapted to position said escapement in accordance with whether said condition is greater or less than a predetermined value.

9. Apparatus for regulating the magnitude of a variable, comprising control means movable to different positions, motor means tending constantly to actuate said control means, means responsive to changes in said magnitude, escapement means for regulating the operation of said control means by said motor means, servo-motor means controlled by said responsive means and cam means controlled by said servo-motor means for operating said escapement means.

10. Apparatus for regulating the magnitude of a variable, comprising control means adapted to assume either of two extreme control positions and an intermediate neutral position, motor means tending constantly to actuate said control means, means responsive to changes in said magnitude, and means operatively connected to said responsive means for stalling said motor means with said control means in said neutral position when a predetermined value of said magnitude is attained and for releasing said motor means to set said control means to one or the other of said extreme positions depending upon whether said magnitude is greater or less than said predetermined value.

11. Apparatus for regulating the magnitude of a variable, comprising control means adapted to assume either of two extreme control positions and an intermediate neutral position, motor means tending constantly to actuate said control means, means responsive to changes in said magnitude, means operatively connected to said responsive means for stalling said motor means with said control means in said neutral position when a predetermined value of said magnitude is attained and for releasing said motor means upon predetermined departure of said magnitude from said value, and other means operatively connected to said responsive means for stalling said motor means with said control means in one or the other of said extreme positions depending upon whether said magnitude is greater or less than said predetermined value.

12. In combination, control means adapted to assume either of two extreme control positions and an intermediate neutral position, and thereby correspondingly to affect the magnitude of a variable to be regulated to a pre-established value, a rotatable shaft, a cam member thereon and having peripheral portions of maximum, minimum and intermediate radii respectively, a cam follower attached to said control means and adapted to engage the periphery of said cam member whereby said control means may be caused to assume any one of said positions according to the radius of the peripheral portion engaged by said follower, a torque motor operatively attached to said shaft to rotate the same, a detent carried by said shaft, a verge member movable to different positions in accordance with the magnitude of said variable, and at its extreme excursions corresponding to magnitudes respectively greater than, and less than, said pre-established value, and when in said extremes adapted to engage said detent to stall said torque motor with said control means set by said cam member in either of its extreme positions, and further detent means carried by said shaft, together with stop means movable with said verge member and adapted to cooperate with said further detent means to stall said torque motor with said cam follower in engagement with the portion of said cam member having intermediate radius, whereby to set said control means in its intermediate neutral position.

13. In an instrument for regulating the magnitude of a variable, a differential gearing comprising two sun wheels and a planetary member engaging the same and positionable in correspondence with differences in position of said sun wheels, one of said sun wheels being adapted to assume a position at all times representative of said magnitude, and the other being manually adjustable to positions representing pre-established values of said variable, control means adapted to assume various positions and thereby correspondingly to affect said magnitude, a motor element continuously tending to impel said control means from one to another of said positions, and mechanical restraining means in part connected to said motor element to restrain the same and in part operable by said planetary member, whereby said restraining means may be released in response to changes in relative position of said sun wheels and said control means thereby caused to assume corresponding positions.

14. Apparatus for regulating the magnitude of a variable, comprising control means settable to different positions, motor means tending constantly to actuate said control means, differential means comprising an element movable in response to changes in said magnitude and another element movable manually to positions corresponding to pre-established values of said magnitude, and restraining means in part connected to said motor means and in part connected to said differential means whereby said restraining means may be released in response to changes in relative position of said elements and said control means thereby caused to assume corresponding positions.

15. Apparatus for regulating the magnitude of a variable, comprising control means settable to different positions, motor means tending constantly to actuate said control means, differential means comprising an element movable in response to changes in said magnitude and another element movable manually to positions corresponding to pre-established values of said magnitude, cam means operable by said differential means, and restraining means in part connected to said motor means and in part connected to said cam means whereby said restraining means may be released in response to changes in relative position of said elements and said control means thereby caused to assumed corresponding positions.

16. Apparatus for regulating the magnitude of a variable, comprising control means settable to two extreme control positions and an intermediate neutral position, motor means tending constantly to actuate said control means, means responsive to changes in said magnitude, said responsive means being adapted to assume an intermediate position when a predetermined value of said magnitude is attained and to assume positions at opposite sides of said intermediate position upon predetermined departure of said magnitude from said value in one direction or the other, and restraining means connected in part to said motor means and in part operable by said responsive means whereby said restraining means may be released in response to changes in position of said responsive means and said control means thereby caused to assume corresponding positions.

17. Apparatus for regulating the magnitude of a variable, comprising control means settable to two extreme control positions and an intermediate neutral position, motor means tending constantly to actuate said control means, means responsive to changes in said magnitude, said responsive means being adapted to assume an intermediate position when a predetermined value of said magnitude is attained and to assume positions at opposite sides of said intermediate position upon predetermined departure of said magnitude from said value in one direction or the other, said responsive means comprising a cam having portions of higher and lower radii corresponding to higher and lower values of said magnitude and an intermediate portion corresponding to said predetermined value, and restraining means connected in part to said motor means and in part operable by said cam whereby said restraining means may be released in response to changes in position of said cam and said control means thereby caused to assume corresponding positions.

CLINTON A. BLAKESLEE.

REFERENCES CITED

The following references are of record in the file of this patent:

UNITED STATES PATENTS

| Number | Name | Date |
| --- | --- | --- |
| 314,027 | Johnson | Mar. 17, 1885 |
| 382,165 | Johnson | May 1, 1888 |
| 511,066 | Tatham | Dec. 19, 1893 |
| 913,982 | Root | Mar. 2, 1909 |
| 1,339,368 | Robertshaw | May 4, 1920 |
| 1,403,963 | Klingel | Jan. 27, 1922 |
| 1,897,857 | Otto et al. | Feb. 14, 1933 |
| 2,000,739 | Bristol et al. | May 7, 1935 |